(12) United States Patent
An et al.

(10) Patent No.: US 10,437,760 B2
(45) Date of Patent: Oct. 8, 2019

(54) VIRTUAL UNIVERSAL SERIAL BUS PERIPHERAL CONTROLLER

(71) Applicant: VMware, Inc., Palo Alto, CA (US)

(72) Inventors: Nan An, Beijing (CN); Jianbin Sun, Beijing (CN); Yan Zhao, Beijing (CN); Zhao Gao, Beijing (CN)

(73) Assignee: VMware, Inc., Palo Alto, CA (US)

( * ) Notice: Subject to any disclaimer, the term of this patent is extended or adjusted under 35 U.S.C. 154(b) by 267 days.

(21) Appl. No.: 15/456,591

(22) Filed: Mar. 13, 2017

(65) Prior Publication Data
US 2018/0260351 A1    Sep. 13, 2018

(51) Int. Cl.
*G06F 13/38*    (2006.01)
*G06F 9/455*    (2018.01)
*G06F 13/42*    (2006.01)
*G06F 13/20*    (2006.01)

(52) U.S. Cl.
CPC ........ *G06F 13/385* (2013.01); *G06F 9/45558* (2013.01); *G06F 13/20* (2013.01); *G06F 13/4282* (2013.01); *G06F 2009/45579* (2013.01)

(58) Field of Classification Search
CPC .......................... G06F 9/45558; G06F 13/385
See application file for complete search history.

(56) References Cited

U.S. PATENT DOCUMENTS

| 6,804,727 B1 * | 10/2004 | Rademacher | G06F 3/1204 |
| | | | 710/305 |
| 2008/0168479 A1 * | 7/2008 | Purtell | G06F 9/45558 |
| | | | 719/328 |
| 2013/0132620 A1 * | 5/2013 | de Goede | G06F 13/105 |
| | | | 710/53 |

* cited by examiner

*Primary Examiner* — Farley Abad
(74) *Attorney, Agent, or Firm* — Thomas | Horstemeyer, LLP

(57) ABSTRACT

A method to intercept an universal serial bus (USB) related request and to respond the intercepted request in a virtualized environment includes connecting a virtual USB peripheral controller in a virtualization software in the virtualized environment to a virtual machine in the virtualized environment. An USB data access request generated by the virtual machine may be intercept by the virtual USB peripheral controller so that the USB data access request does not reach a kernel space of the virtualization software and physical hardware resources supporting the virtualized environment. The method further includes generating a response according to the USB data access request and a process called by a firmware framework module of the virtual USB peripheral controller and transmitting generated response towards the virtual machine.

19 Claims, 4 Drawing Sheets

_US 10,437,760 B2_

VIRTUAL UNIVERSAL SERIAL BUS PERIPHERAL CONTROLLER

BACKGROUND

Universal serial bus (USB) is an interface configured to connect one or more peripheral devices (e.g., cameras, scanners, etc.) to a computer. With USB, the computer may send or retrieve data to and from the one or more peripheral devices. A physical USB peripheral controller is disposed between the computer and the one or more peripheral devices and is configured to transfer data between the computer and the one or more peripheral devices. In addition, the physical USB peripheral controller may emulate various USB data transfer scenarios. For example, the physical USB peripheral controller may be configured to emulate a USB peripheral scanner to receive USB requests and respond to the computer. Thus, to test the data transfer of a set of USB peripheral devices, instead of actually obtaining the USB peripheral devices, the physical USB peripheral controller may be configured to emulate these USB peripheral devices.

FIG. 1 illustrates convention physical USB peripheral controller 110 in virtualized computing environment 100. Virtualized computing environment 100 may include one or more physical servers 120, each of which includes a suitable physical hardware 130 and virtualization software 140 (e.g., hypervisor) to support multiple virtual machines 152, 154, and 156. Virtualization software 140 generally maintains a mapping between resources allocated to virtual machines 152, 154, and 156, and physical hardware 130 provided by physical servers 120.

Physical USB peripheral controller 110 may be attached to USB port 132 of physical hardware 130. Virtualization software 140 includes USB driver 142, which communicates with physical USB peripheral controller 110 via USB port 132. Virtualization software 140 further includes USB arbitrator 144, which is configured to manage connections between physical USB peripheral controller 110 and virtual machines 152, 154, and 156 that reside on physical server 120. Suppose virtual machine 152 is powered on. In such a scenario, USB arbitrator 144 is configured to connect physical USB peripheral controller 110 to virtual machine 152 and direct data traffic between physical USB peripheral controller 110 and virtual machine 152. When physical USB peripheral controller 110 is connected to virtual machine 152, USB arbitrator 144 is also configured to prevent other virtual machines (e.g., virtual machines 154 and 156) from accessing physical USB peripheral controller 110.

However, the arrangement set forth above requires the support of USB related hardware (e.g., USB port 132) in physical server 120 and a physical attachment between physical peripheral controller 110 and physical server 120.

DETAILED DESCRIPTION

Figure 1:
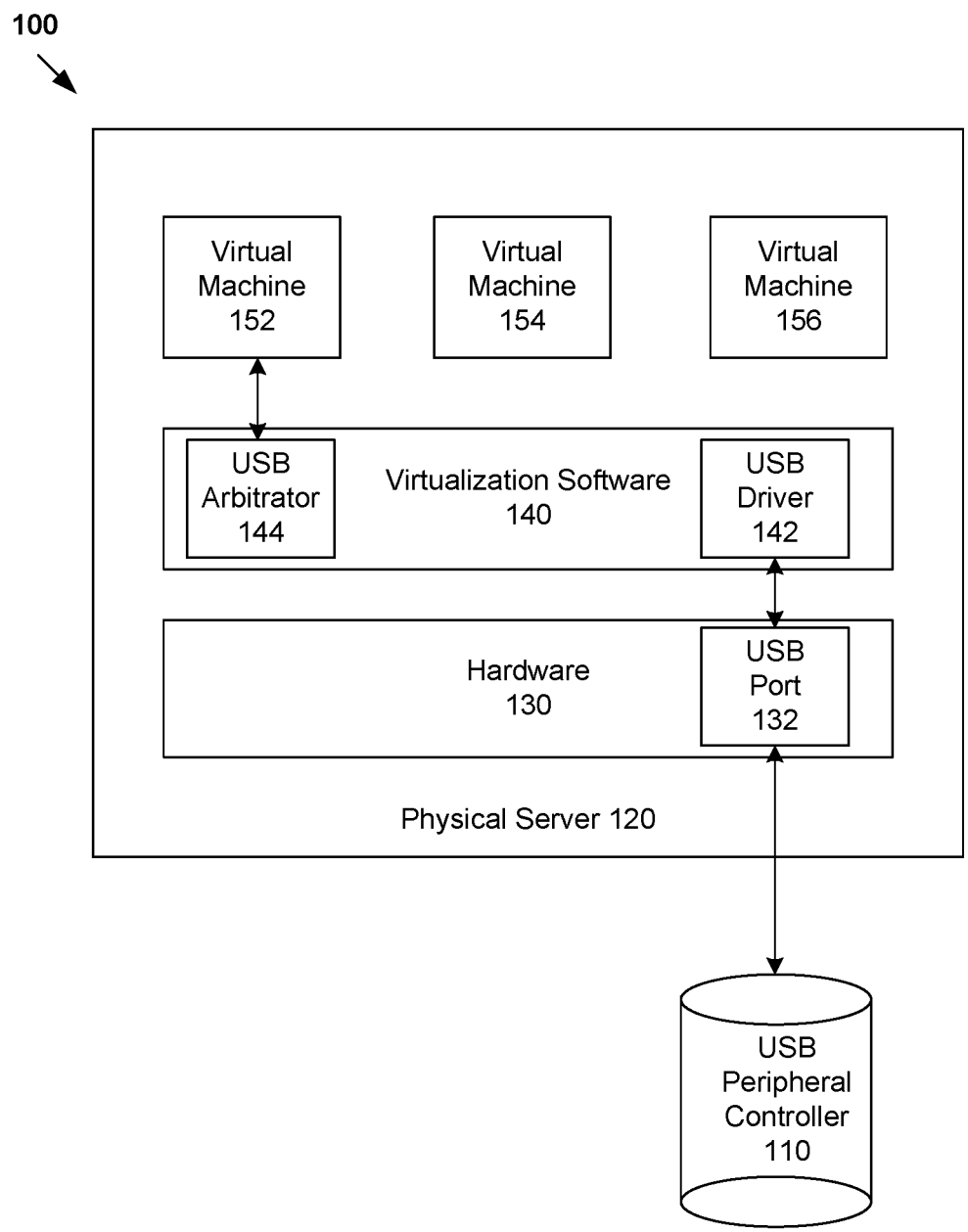
FIG. 1 is a schematic diagram of a convention physical USB peripheral controller in a virtualized computing environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Figure 2:
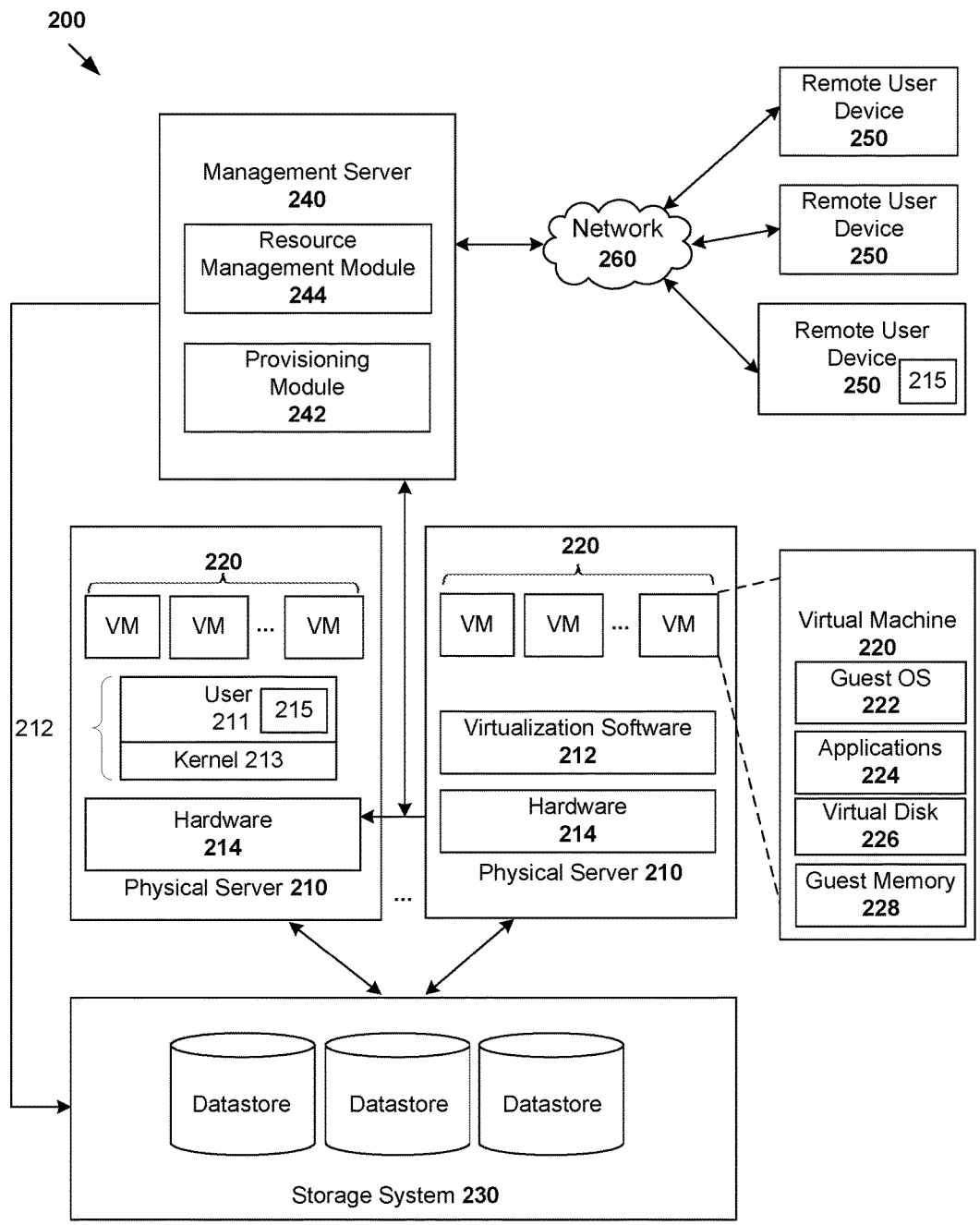
FIG. 2 is a schematic diagram of an example virtual USB peripheral controller in a virtualized computing environment, in accordance to at least some examples in the present disclosure.

FIG. 2 is a schematic diagram of example virtual USB peripheral controller 215 in virtualized computing environment 200, in accordance to at least some examples in the present disclosure. Although an example is shown, it should be understood that virtualized computing environment 200 may include additional or alternative components, and may have a different configuration.

Virtualized computing environment 200 may include one or more physical servers 210 (also known as "hosts" or "VM ESXi™ hosts"), each of which includes suitable physical hardware 214 and virtualization software 212 (e.g., hypervisor) to support multiple virtual machines 220. Virtualization software 212 generally maintains a mapping between resources allocated to virtual machines 220 and physical hardware resources 214 provided by physical servers 210 and a storage system 230. In practice, there may be any suitable number of physical servers 210, each supporting any suitable number of virtual machines 220.

In some embodiments, virtualization software 212 includes kernel space 213 and user space 211. Kernel space 213 is configured to run a privileged operating system kernel, kernel extensions, and device drivers. User space 211 is configured to run application software. In some embodiments, virtual USB peripheral controller 215, including a firmware framework module and a user-defined logic module, both may be executed as an application in user space 211. Virtual USB peripheral controller 215 is configured to emulate various USB data transfer scenarios between virtual USB peripheral controller 215 and virtual machines 220. Some example USB data transfer scenarios may include control data transfer, isochronous data transfer, interrupt data transfer, and bulk data transfer. Virtual USB peripheral controller 215 is configured to intercept all USB related requests from virtual machines 220 and respond to these USB related requests back to virtual machines 220. Therefore, the USB relates requests from virtual machines 220 do not reach kernel space 213 and hardware 214 of physical server 220. Subsequent paragraphs will further detail the operations of virtual USB peripheral controller 215.

Management server 240 supports various services that may be accessed by remote user devices 250 via a network 260, such as using an application programming interface (API). Remote user devices 250 may be operated by any suitable users, such as system administrators, organization administrators, database users, application developers, system architects, etc. In some embodiments, virtual USB peripheral controller 215 may include a firmware framework module and a user-defined logic module, which both may be executed as an application on remote user device 250. Any suitable computing device may be used as remote user device 250, such as desktop computer, mobile device, tablet computer, and personal digital assistant, etc.

Management server 240 may include any suitable modules to support the services. For simplicity, in the example illustrated in FIG. 2, management server 240 includes provisioning module 242 for the provisioning and management of virtual machines 220 and resource management module 244 (also known as "resource scheduler") for the management of resources in virtualized computing environment 200.

In practice, management server 240 may be implemented by multiple physical machines. The consideration as to whether management server 240 is implemented on one or multiple physical machines may depend on the performance of the underlying machines.

When any of virtual machines 220 is created via provisioning module 242, a certain amount of resources is allocated to virtual components (e.g., a virtual disk 226 and/or a guest memory 228) of virtual machine 220, such as to support a guest operating system 222 and applications 224. For example, the allocated resources may include CPU resources (e.g., processors), memory resources (e.g., guest memory 228 supported by random access memory), network resources (e.g., access networks, group of ports, etc.) and storage resources (e.g., virtual disk 226 supported by storage system 230), etc.

A pool of CPU and memory resources of physical servers 210 may be bundled and assigned as a "resource pool" to one of virtual machines 220. For example, memory resources in the resource pool may be allocated in the form of "guest memory 228," which may generally refer to a memory to any of guest operating system 222. Storage resources may be allocated in the form of the "virtual disk" 226, which may generally refer to file or files on a file system that appear as a single hard disk to guest operating system 222. Virtual disk 226 is generally used to store data relating to guest operating system 222 and applications 224.

Resource management module 244 may use information relating to virtual machines 220 (e.g., provided by provisioning module 242) to manage how CPU, memory, storage and network resources are allocated to different virtual machines 220. In some embodiments, resource management module 244 monitors virtual machines 220 and updates their status based on how they utilize resources allocated to them. For example, resource management module 244 may collect various resource usage data of a virtual component (e.g., guest memory 228) and/or a physical hardware resource 214 provided by physical servers 210.

Figure 3:
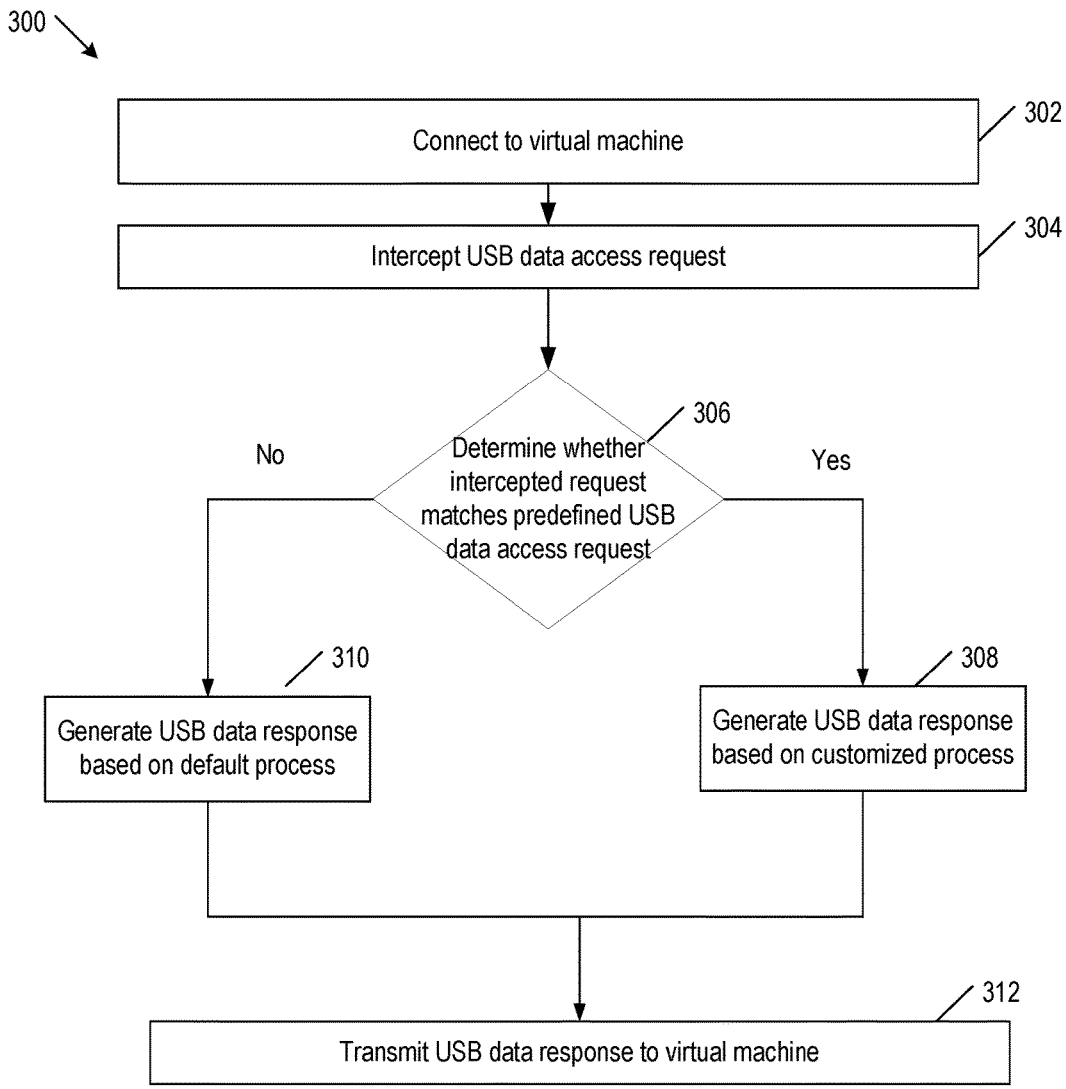
FIG. 3 is a flowchart of an example process to intercept USB related requests and to respond the intercepted requests in a virtualized computing environment, in accordance to at least some examples in the present disclosure.

FIG. 3 is a flowchart of an example process 300 to intercept USB related requests and to respond the intercepted requests in a virtualized computing environment, in accordance to at least some examples in the present disclosure. The example process 300 may include one or more operations, functions, or actions illustrated by one or more blocks, such as 302 to 312. The various blocks may be combined into fewer blocks, divided into additional blocks, and/or eliminated depending on the desired implementation. In some embodiments, one or more blocks of the various blocks may be performed by virtual USB peripheral controller 215 executed in user space 211 of virtualization software 212 as illustrated in FIG. 2. Alternatively, one or more blocks of the various blocks may be performed by virtual USB peripheral controller 215 executed on remote user device 250 also illustrated in FIG. 2.

Example process 300 may begin in block 302. In conjunction with FIG. 2, in block 302, virtual USB peripheral controller 215 is connected to a powered-on virtual machine, such as virtual machine 220. In some embodiments, virtual USB peripheral controller 215 transmits a USB device descriptor of virtual USB peripheral controller 215 to guest operating system 222 of virtual machine 220. The USB device descriptor includes information of a USB device, which virtual USB peripheral controller 215 is configured to emulate. For example, the USB device descriptor may include information of, without limitation, device class, device protocol, vendor identifier, product identifier, etc. After reading the USB device descriptor, guest operating system 222 generates a set of identifiers for virtual USB peripheral controller 215. With the generated identifiers, guest operating system 222 is able to communicate with virtual USB peripheral controller 215 based on one or more USB protocols. In this virtualized computing environment 200, virtual machine 220 does not communicate with a convention physical USB peripheral controller attached to physical server 210. Block 302 may be followed by block 304.

In block 304, in conjunction with FIG. 2, virtual USB peripheral controller 215 intercepts USB related requests from virtual machine 220 to access and retrieve data from virtual USB peripheral controller 215. Unlike the earlier described conventional approach, virtual USB peripheral controller 215 intercepts these requests in user space 211 of virtualization software 212. As a result, the USB related requests do not reach kernel space 213 of virtualization software 212 and/or hardware 214 of physical server 210.

In an alternative embodiment, virtual USB peripheral controller 215 corresponds to an application running on the operating system of remote user device 250 and also intercepts the USB related requests at the application. Similarly, the USB related requests do not reach the kernel space of remote user device 250's operating system and/or hardware resources of remote user device 250.

Figure 4:
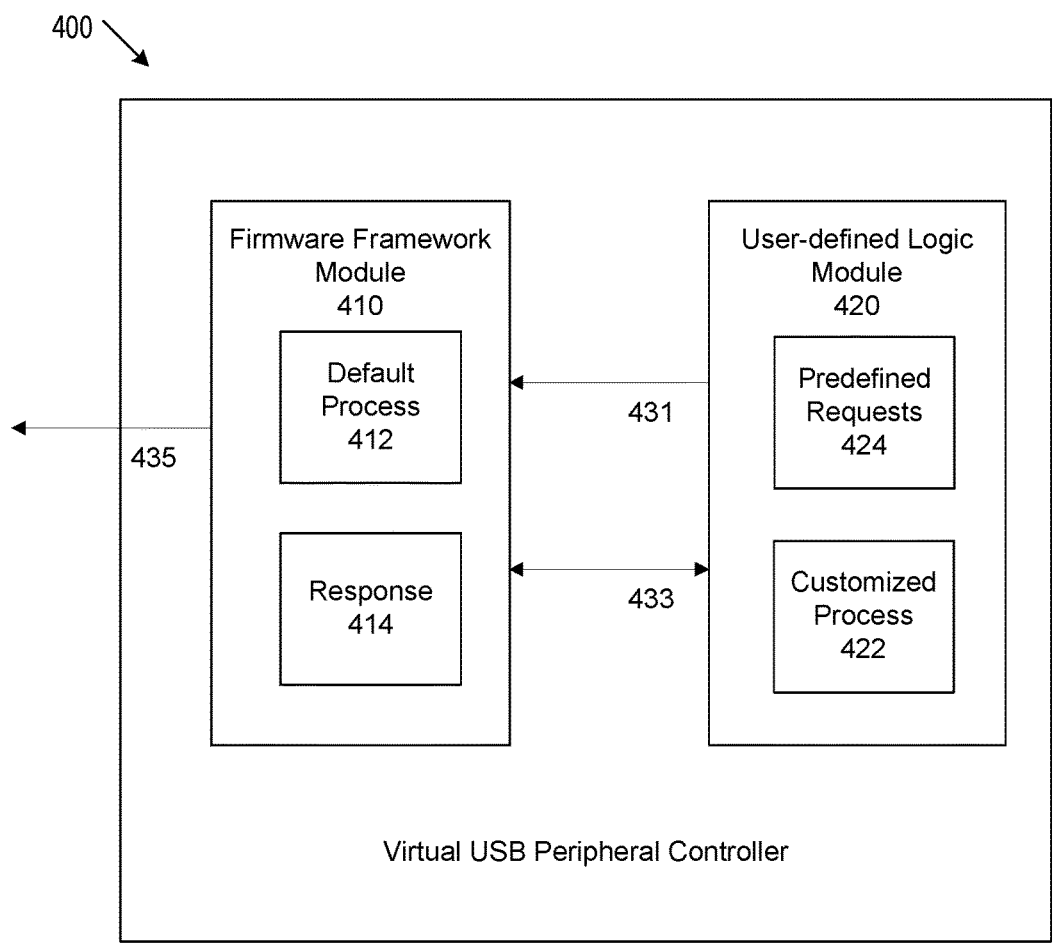
FIG. 4 is a schematic diagram of an example firmware framework module and an example user-defined logic module in a virtual USB peripheral controller, in accordance to at least some examples in the present disclosure.

FIG. 4 is a schematic diagram of an example firmware framework module 410 and an example user-defined logic module 420 in virtual USB peripheral controller 400, in accordance to at least some examples in the present disclosure. In some embodiments, virtual USB peripheral controller 400 may correspond to virtual USB peripheral controller 215 illustrated in FIG. 2 and described above. Virtual USB peripheral controller 400 may include, without limitation, firmware framework module 410 and user-defined logic module 420. In some embodiments, firmware framework module 410 is configured to transmit the USB device descriptor of virtual USB peripheral controller 215 to guest operating system 222 of virtual machine 220. User-defined logic module 420 is configured to define USB data access requests 424 and to include one or more customized processes in response to predefined USB data access requests 424. User-defined logic module 420 may use RegisterCallback function 431 to notify firmware framework module 410 of predefined USB data access requests 424.

In conjunction with FIG. 4, block 304 in FIG. 3 may be followed by block 306. In some embodiments, in block 306, firmware framework module 410 is configured to determine whether the intercepted USB related requests from virtual machine 220 match any of predefined USB data access requests 424. In response to the determination that intercepted requests from virtual machine 220 indeed match any of predefined USB data access requests 424, block 306 may be followed by block 308.

In block 308, in conjunction with FIG. 4, firmware framework module 410 is configured to call user-defined callback 433 to load customized process 422 from user-defined logic module 420. Firmware framework module 410 may be further configured to generate responses 414 to intercept USB data access requests according to customized process 422. In some embodiments, customized process 422 may make firmware framework module 410 generate responses, which are different from the responses in accordance with USB protocols. Block 308 may be followed by block 312 where firmware framework module 410 is configured to transmit generated responses 414 towards virtual machine 220 through connection 435 established in block 302.

In response to the determination that the intercepted requests from virtual machine 220 do not match any of predefined USB data access 424, block 306 may be followed by block 310.

In block 310, firmware framework module 410 is configured to call a default process 412 from firmware framework module 410 itself. Firmware framework module 410 is further configured to generate responses 414 to intercepted USB data access requests according to default process 412. In some embodiments, default process 412 may make firmware framework module 410 generate responses in consistence with USB protocols. Block 310 may be followed by block 312 where firmware framework module 410 is configured to transmit generated responses 414 towards virtual machine 220 through connection 435 established in block 301.

Example 1: Control Data Transfer (Scenario 1)

In some embodiments, a virtual USB peripheral controller may be configured to emulate control data transfer mode. Control data transfer is generally used in USB system to query, configure, and issue generic commands from a USB host to USB peripheral devices. Control data transfer usually has a higher priority than other data transfer types but carries relevant few data (e.g., 8 bytes).

In this example, suppose the USB data access requests in accordance with the control data transfer mode that virtual USB peripheral controller 400 receives do not match predefined USB data access requests 424 in user-defined logic module 420.

In conjunction with FIG. 2, FIG. 3, and FIG. 4, in response to receiving the USB data access requests of reading 8 bytes of USB data in accordance with the control data transfer mode, firmware framework module 410 is configured to call default process 412 from firmware framework module 410. In some embodiments, in block 310, firmware framework module 410 may use default process 412 to generate responses 414 of 8 bytes in accordance with the control data transfer mode. In block 312, firmware framework module 410 is configured to transmit the generated responses 414 towards virtual machine 220 through connection 435.

Example 2: Control Data Transfer (Scenario 2)

In this example, suppose the USB data access requests in accordance with the control data transfer mode that virtual USB peripheral controller 400 receives match at least one of predefined USB data access requests 424 in user-defined logic module 420.

In conjunction with FIG. 2, FIG. 3, and FIG. 4, user-defined logic module 420 may use RegisterCallback function 431 to notify firmware framework module 410 of a match between the USB data access requests in accordance with the control data transfer mode and predefined USB data access requests 424. Therefore, in response to receiving USB data access requests of reading 8 bytes of USB data in accordance with the control data transfer mode, firmware framework module 410 is configured to determine these USB data access requests match predefined USB data access requests 424. Firmware framework module 410 is further configured to call user-defined callback 433 to retrieve customized process 422 from user-defined logic module 420.

In block 308, firmware framework module 410 may use customized process 422 to generate responses 414. In some embodiments, customized process 422 may be configured to deliberately generate responses 414 that are inconsistent from the USB related requests. For instance, response 414 may include USB data with a different byte size than the requested 8 bytes (e.g., 9 bytes). Block 308 may be followed by block 312. In block 312, firmware framework module 410 transmits generated responses 414 consisting of 9 bytes towards virtual machine 220. Since virtual machine 220 requests for 8 bytes of USB data but receives responses 414 with 9 bytes, the error detection mechanism of virtual machine 220 may be tested.

Example 3: Control Data Transfer (Scenario 3)

In this example, suppose the USB data access requests in accordance with the control data transfer mode that virtual USB peripheral controller 400 receives similarly match at least one of predefined USB data access requests 424 in user-defined logic module 420.

In conjunction with FIG. 2, FIG. 3, and FIG. 4, in block 308, firmware framework module 410 may use customized process 422 to not generate any responses 414. Block 308 may be followed by block 312. Accordingly, in block 312, firmware framework module 410 does not transmit any responses 414 towards virtual machine 220. Since virtual machine 220 sends out requests but fails to receive any responses 414, the data recovery mechanism of virtual machine 220 may be tested.

Example 4: Isochronous Data Transfer

In some embodiments, a virtual USB peripheral controller may be configured to emulate isochronous data transfer mode. Isochronous data transfer is usually used to stream data that is time-critical and error-tolerant (e.g., internet telephony application). Therefore, in response to receiving USB data access requests in accordance with the isochronous data transfer mode (e.g., a time-critical request of reading data not less than 30 Mbps), firmware framework module 410 is configured to determine whether these USB data access requests match predefined USB data access requests 424. Firmware framework module 410 is further configured to call user-defined callback 433 to retrieve customized process 422 from user-defined logic module 420.

In conjunction with FIG. 2, FIG. 3, and FIG. 4, user-defined logic module 420 may use RegisterCallback function 431 to notify firmware framework module 410 that USB data access requests in accordance with the isochronous data transfer mode matches one of predefined USB data access requests 424.

In response to receiving USB data access requests from application 224 (e.g., video conference application) of virtual machine 220 including a time-critical request, firmware framework module 410 is configured to call user-defined callback 433 to retrieve customized process 422 from user-defined logic module 420. In some embodiments, in block 308, firmware framework module 410 may use customized process 422 to deliberately generate responses 414. In block 312, firmware framework module 410 transmits generated responses 414 towards virtual machine 220 with a rate of 29 Mbps, not the requested 30 Mbps. With this generated responses 414 that differs from the initial request of virtual machine 220, the tolerance level of application 224 handling less than 30 Mbps is thus tested.

Referring back to conventional physical USB peripheral controller 110 of FIG. 1, because the responses generated by physical USB peripheral controller 110 must pass through hardware 130 and the kernel space of virtualization software 140 before reaching virtual machine 152, sometimes responses may be blocked by the kernel space and/or hardware 130. For examples, the kernel space and/or hardware 130 may be configured with policies of discarding data that fail to meet certain criteria. On the other hand, by generating responses 414 based on customized process 422 in user space 211, responses 414 that may be blocked by kernel space 213 of virtualization software 212 and/or hardware 214 instead can be used to develop more robust testing.

The methods, processes and components described herein may be implemented by hardware (including hardware logic circuitry), software or firmware or a combination thereof. The term 'processor' is to be interpreted broadly to include a processing unit, ASIC, logic unit, or programmable gate array etc. The techniques introduced above may be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non recordable media (e.g., read-only memory (ROM), random access memory (RAM), magnetic disk storage media, optical storage media, flash memory devices, etc.)

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method to intercept an universal serial bus (USB) related request and respond to the intercepted request in a virtualized environment, wherein the virtualized environment includes a physical host with physical hardware resources that executes a virtualization software and supports one or more virtual machines, the method comprising:
   connecting a virtual USB peripheral controller in the virtualization software to a virtual machine;
   intercepting a USB data access request from the virtual machine to prevent the USB data access request from reaching a kernel space of the virtualization software and the physical hardware resources;
   generating a response according to the USB data access request and a process called by a firmware framework module of the virtual USB peripheral controller, wherein the firmware framework module resides in a user space of the virtualization software or in an application on a remote user device; and
   transmitting the generated response towards the virtual machine.

2. The method of claim 1, wherein the connecting of the virtual USB peripheral controller and the virtual machine further comprises transmitting a USB device descriptor of the virtual USB peripheral controller to a guest operating system of the virtual machine, and wherein the USB device descriptor includes a vendor identifier of the virtual USB peripheral controller and a product identifier of the virtual USB peripheral controller.

3. The method of claim 1, wherein the remote user device is configured to access one or more services provided by a management server in the virtualized environment.

4. The method of claim 1, wherein the intercepting of the USB data access request is performed at a user space of the virtualization software or an application of a remote user device.

5. The method of claim 1, further comprising determining whether the USB data access request matches a USB data access request predefined in a user-defined logic module of the virtual USB peripheral controller.

6. The method of claim 5, in response to a determination that the USB data access request matches the USB data access request predefined in the user-defined logic module, the method further comprising:
   calling a customized process from the user-defined logic module so that the generating of the response is based on the customized process.

7. The method of claim 6, wherein the generated response is inconsistent with the USB data access request.

8. The method of claim 7, wherein the generating of the response includes generating a response based on the customized process including data sizes different from the data sizes requested in the USB data access request.

9. The method of claim 7, wherein the generating of the response includes generating a response based on the customized process with a transmission rate different from the transmission rate requested in the USB data access request.

10. The method of claim 5, in response to a determination that the USB data access request does not match the USB data access request predefined in the user-defined logic module, the method further comprising:
    calling a default process from the firmware framework module so that the generating of the response is based on the default process.

11. The method of claim 10, wherein the generated response is inconsistent with the USB data access request.

12. A computer system configured to intercept an USB related request and to respond to the intercepted request in a virtualized environment, wherein the virtualized environment includes a physical host with physical hardware resources that executes a virtualization software and supports one or more virtual machines, the computer system comprising a processor and a display and the processor being programmed to:

connect a virtual USB peripheral controller in the virtualization software to a virtual machine;

intercept a USB data access request from the virtual machine to prevent the USB data access request from reaching a kernel space of the virtualization software and the physical hardware resources;

generate a response according to the USB data access request and a process called by a firmware framework module of the virtual USB peripheral controller, wherein the firmware framework module resides in a user space of the virtualization software or in an application executed on a remote user device; and transmit the generated response towards the virtual machine.

13. The computer system of claim 12, wherein the remote user device is configured to access one or more services provided by a management server in the virtualized environment.

14. The computer system of claim 12, wherein the connecting of the virtual USB peripheral controller and the virtual machine further comprises transmitting a USB device descriptor of the virtual USB peripheral controller to a guest operating system of the virtual machine, and wherein the USB device descriptor includes a vendor identifier of the virtual USB peripheral controller and a product identifier of the virtual USB peripheral controller.

15. The computer system of claim 12, wherein the intercepting of the USB data access request is performed at a user space of the virtualization software or an application of a remote user device.

16. The computer system of claim 12, the processor further being programmed to determine whether the USB data access request matches a USB data access request predefined in a user-defined logic module of the virtual USB peripheral controller.

17. The computer system of claim 16, in response to a determination that the USB data access request matches the USB data access request predefined in the user-defined logic module, the processor further being programmed to:

call a customized process from the user-defined logic module so that the generating of the response is based on the customized process.

18. The computer system of claim 17, wherein the generated response includes data sizes different from the data sizes requested in the USB data access request or a transmission rate different from the transmission rate requested in the USB data access request.

19. The computer system of claim 16, in response to a determination that the USB data access request does not match the USB data access request predefined in the user-defined logic module, the processor further being programmed to:

call a default process from the firmware framework module to generate the response so that the response is in consistent with the USB data access request.

\* \* \* \* \*